(12) United States Patent
Vaughey et al.

(10) Patent No.: US 6,221,531 B1
(45) Date of Patent: Apr. 24, 2001

(54) LITHIUM-TITANIUM-OXIDE ANODES FOR LITHIUM BATTERIES

(75) Inventors: John T. Vaughey, Elmhurst; Michael M. Thackeray, Naperville; Arthur J. Kahaian, Chicago; Andrew N. Jansen, Bolingbrook; Chun-hua Chen, Westmont, all of IL (US)

(73) Assignee: The University of Chicago, Chicago, IL (US)

( * ) Notice: Subject to any disclaimer, the term of this patent is extended or adjusted under 35 U.S.C. 154(b) by 0 days.

(21) Appl. No.: 09/349,819

(22) Filed: Jul. 8, 1999

Related U.S. Application Data
(60) Provisional application No. 60/092,181, filed on Jul. 9, 1998.

(51) Int. Cl.[7] .................................................. H01M 4/58
(52) U.S. Cl. ................................ 429/231.1; 429/231.6; 429/231.95; 423/592; 423/598; 423/600; 423/635
(58) Field of Search ............................ 429/223, 231.1, 429/231.3, 231.6, 231.95; 423/592, 598, 600, 635

(56) References Cited

U.S. PATENT DOCUMENTS

| | | | |
|---|---|---|---|
| 5,478,675 | * 12/1995 | Nagaura | 429/224 |
| 5,545,468 | * 8/1996 | Koshiba et al. | 429/218.1 |
| 5,591,546 | * 1/1997 | Nagaura | 429/218.1 |
| 5,998,063 | * 12/1999 | Kobayashi et al. | 429/218.1 |

OTHER PUBLICATIONS

Lambert et al. "The superconductor–semiconductor transition in cation–substituted lithium titanate", Disord. Semicond. (1987), pp. 135–149, abstract.*

* cited by examiner

*Primary Examiner*—Laura Weiner
(74) *Attorney, Agent, or Firm*—Emrich & Dithmar

(57) ABSTRACT

A spinel-type structure with the general formula $Li[Ti_{1.67}Li_{0.33-y}M_y]O_4$, for $0<y\leq0.33$, where M=Mg and/or Al. The structure is useful as a negative electrode for a non-aqueous electrochemical cell and in a non-aqueous battery comprising an plurality of cells, electrically connected, each cell comprising a negative electrode, an electrolyte and a positive electrode, the negative electrode consisting of the spinel-type structure disclosed.

14 Claims, 14 Drawing Sheets

LITHIUM-TITANIUM-OXIDE ANODES FOR LITHIUM BATTERIES

RELATED APPLICATION

This application, pursuant to 37 C.F.R. § 1.78(c), claims priority based on provisional application serial no. 60/092,181 filed Jul. 9, 1998.

CONTRACTUAL ORIGIN OF THE INVENTION

The United States Government has rights in this invention pursuant to Contract No. W-31-109-ENG-38 between the U.S. Department of Energy (DOE) and The University of Chicago representing Argonne National Laboratory.

BACKGROUND OF THE INVENTION

Rechargeable lithium battery technology has become increasingly important in recent years because it is providing new, lightweight, high energy density batteries for powering applications in the rapidly growing electronics industry. These batteries are also of interest because of their possible application in electric vehicles and hybrid electric vehicles. State-of-the-art rechargeable lithium batteries are known as "lithium-ion" batteries because during charge and discharge, lithium ions are shuttled between two host electrode structures with a concomitant reduction and oxidation of the host electrodes. The best known lithium-ion cell is a 3.5 V $Li_xC_6/Li_{1-x}CoO_2$ cell, in which lithium is extracted from a layered $LiCoO_2$ structure (positive electrode or cathode) during charge and inserted into a carbonaceous structure (negative electrode or anode), typically graphite or a "hard" or pyrolyzed carbon. Lithiated carbons can approach and reach the potential of metallic lithium at the top of the charge cycle. Therefore, these negative electrodes or anodes are highly reactive materials, particularly in the presence of a highly oxidizing $Li_{1-x}CoO_2$ positive electrode and a flammable organic electrolyte. There is, therefore, a concern about the safety of charged lithium-ion cells; sophisticated electronic circuitry has to be incorporated into each cell to protect them from overcharge and abuse. This invention addresses the need to find alternative negative electrode materials to carbon.

The spinel, $Li_4Ti_5O_{12}$, is an attractive alternative negative electrode material to carbon. Three lithium ions can be inserted into the structure according to the reaction:

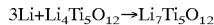

This reaction occurs at approximately 1.5 V vs. metallic lithium, thereby providing a relatively safe electrode system compared to carbon. However, safety is gained at the expense of cell voltage and energy density. A further limitation is that $Li_4Ti_5O_{12}$ provides a relatively low theoretical capacity (175 mAh/g) compared to lithiated graphite ($LiC_6$, 372 mAh/g). Nevertheless, despite these limitations, cells with lithium-titanium-oxide negative electrodes can still be coupled to high voltage (4 V) positive electrode materials, such as the layered oxides $LiCoO_2$, $LiNiO_2$, $LiCo_{1-x}Ni_xO_2$, and spinel oxides, for example, $LiMn_2O_4$ to provide cells with an operating voltage of between 2.4 and 2.2 V. It is anticipated that these cells will become increasingly attractive from at safety standpoint, particularly as the voltage requirement for powering semiconducting devices decreases in time. For example, a 2.4 V lithium-ion cell can be constructed by coupling two spinel electrodes:

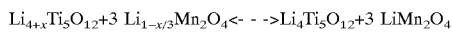

From a structural viewpoint, $Li_4T_{15}O_{12}$ is an example of an almost ideal host electrode for a lithium-ion cell. Lithium insertion into the cubic $Li_4T_{15}O_{12}$ spinel structure occurs with virtually no change in the lattice parameter (8.36 Å); the unit cell expands and contracts isotropically during lithium insertion and extraction, thereby providing an extremely stable electrode structure; it can undergo many hundreds of cycles without structural disintegration. Moreover, lithium insertion causes a first-order displacement of the tetrahedrally-coordinated lithium ions in the $Li_4Ti_5O_{12}$ spinel structure into octahedral sites to generate the ordered rock salt phase $Li_7Ti_5O_{12}$. The insertion (and extraction) of lithium is thus a two-phase reaction which provides a constant voltage response (at approximately 1.5 V). Furthermore, the voltage of a $Li/Li_{4+x}Ti_5O_{,12}$ cell changes abruptly at the end of discharge and charge. Thus, a $Li_{4+x}Ti_5O_{12}$ spinel electrode provides very sharp end-of-charge and end-of-discharge indicators which is useful for controlling cell operation and preventing overcharge and overdischarge.

A major disadvantage of a $Li_4Ti_5O_{12}$ spinel electrode is that all the titanium ions in the structure are tetravalent; the material is thus an insulator, with negligible electronic conductivity—it is white in color. Good insertion electrodes should have both good ionic conductivity to allow rapid lithium-ion diffusion within the host and good electronic conductivity to transfer electrons from the host structure to the external circuit during charge and discharge. To overcome poor electronic conductivity, it is customary to add an electronic current collector, such as carbon, to metal oxide host electrodes. Thus, throughout the discharge and charge processes, the two-phase $Li_{4+x}Ti_5O_{12}$ electrode will consist of an insulating $Li_4Ti_5O_{12}$ spinel phase (in which the titanium ions are all tetravalent) and a mixed-valent, electronically-conducting rock salt phase $Li_7Ti_5O_{12}$, in which the mean oxidation state of the titanium ions is 3.4 (i.e., 60% $Ti^{3+}$ and 40% $Ti^{4+}$). Thus, when lithium is extracted from $Li_7Ti_5O_{12}$, the insulating phase $Li_4Ti_5O_{12}$ will be formed at the surface of the electrode particles. The insulating properties of $Li_4Ti_5O_{12}$ will inhibit electronic conductivity at the surface of the particles, thus reducing the rate of electron transfer and the capability of the cell to pass current.

SUMMARY OF THE INVENTION

This invention relates to new modified lithium-titanium-oxide materials with a spinel-type structure with improved electronic conductivity. The materials are of particular interest as negative electrodes (anodes) for lithium cells and batteries, and, in particular, rechargeable lithium batteries. The invention therefore includes new materials, methods of making the materials, the use of the materials as electrodes (negative or positive) in lithium cells and batteries, and cells and batteries employing such electrodes.

It would thus be advantageous to prepare a lithium titanium oxide spinel that is electronically conducting to enhance the performance of the standard insulating $Li_4Ti_5O_{12}$ electrode. This invention relates to the preparation of novel substituted $Li_4Ti_5O_{12}$ spinel materials and electrodes, $Li_{4-x}Ti_5M_xO_{12}(0<x\leq 1)$, or alternatively in spinel notation $Li[Ti_{1.67}Li_{0.33-y}M_y]O_4(0<y\leq 0.33)$, in which the lithium ions on the octahedral sites are partially substituted by M cations, where M is $Mg^{2+}$ and/or $Al^{3+}$, to reduce the oxidation state of the titanium ions, thereby generating a mixed-valent $Ti^{4+}/Ti^{3+}$ couple within the spinel structure at all states of charge and discharge and enhancing the electronic conductivity of the spinel electrode. The invention is extended to include the family of spinel compounds Li[Ti$_{1.67}$Li$_{0.33-y}$M$_{y-z}$M'$_z$]O$_4$ that can be derived from Li[Ti$_{1.67}$Li$_{0.33-y}$M$_y$]O$_4$ by partial substitution of the M cations by M' cations where 0<y≦0.33, z<y, M is Mg$^{2+}$ and/or Al$^{3+}$, and M' is one or more suitable monovalent, divalent, trivalent and tetravalent metal cations. The M' metal cations are selected from the first row of transition metals, preferably from Co$^{+3}$, Co$^{+2}$, Ni$^{+2}$ and Ni$^{+3}$. The metal cations M', are most preferably selected from those ions that have ionic radii comparable to the Li$^+$, Ti$^{4+}$ and Ti$^{3+}$ ions within the [Ti$_{1.67}$Li$_{0.33-y}$M$_y$]O$_4$ spinel framework, preferably within 0.15 Å.

The principles of this invention will be described by particular reference to the lithium-titanium-oxide spinel system Li$_{4-x}$Ti$_5$M$_x$O$_{12}$(0<x≦1), or alternatively in spinel notation Li[Ti$_{1.67}$Li$_{0.33-y}$M$_y$]O$_4$(0<y≦0.33), in which magnesium and aluminum are used as the substituting metal cation M. In general, the electrochemical properties of the spinel electrodes have been evaluated in cells against a lithium counter [reference] electrode.

BRIEF DESCRIPTION OF THE DRAWINGS

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

DESCRIPTION OF THE PREFERRED EMBODIMENT

Figure 1:
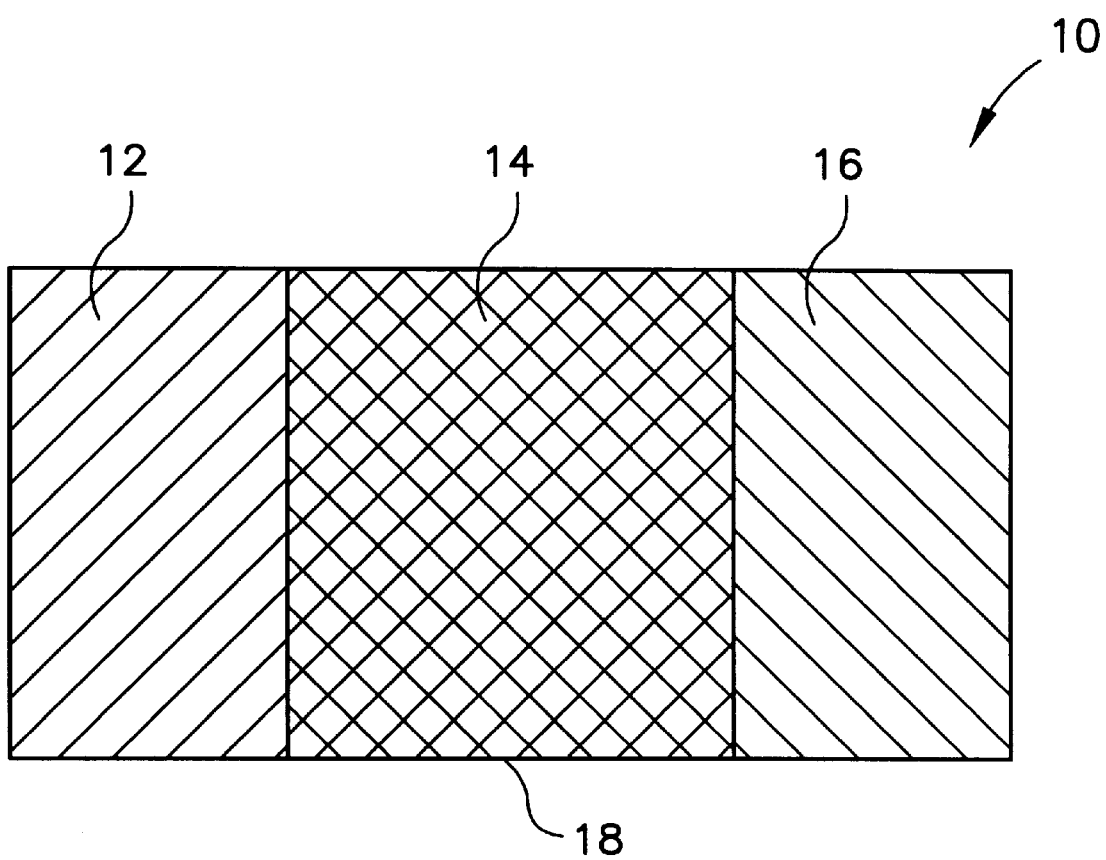
FIG. 1 depicts a schematic representation of an electrochemical cell.
Figure 1A:
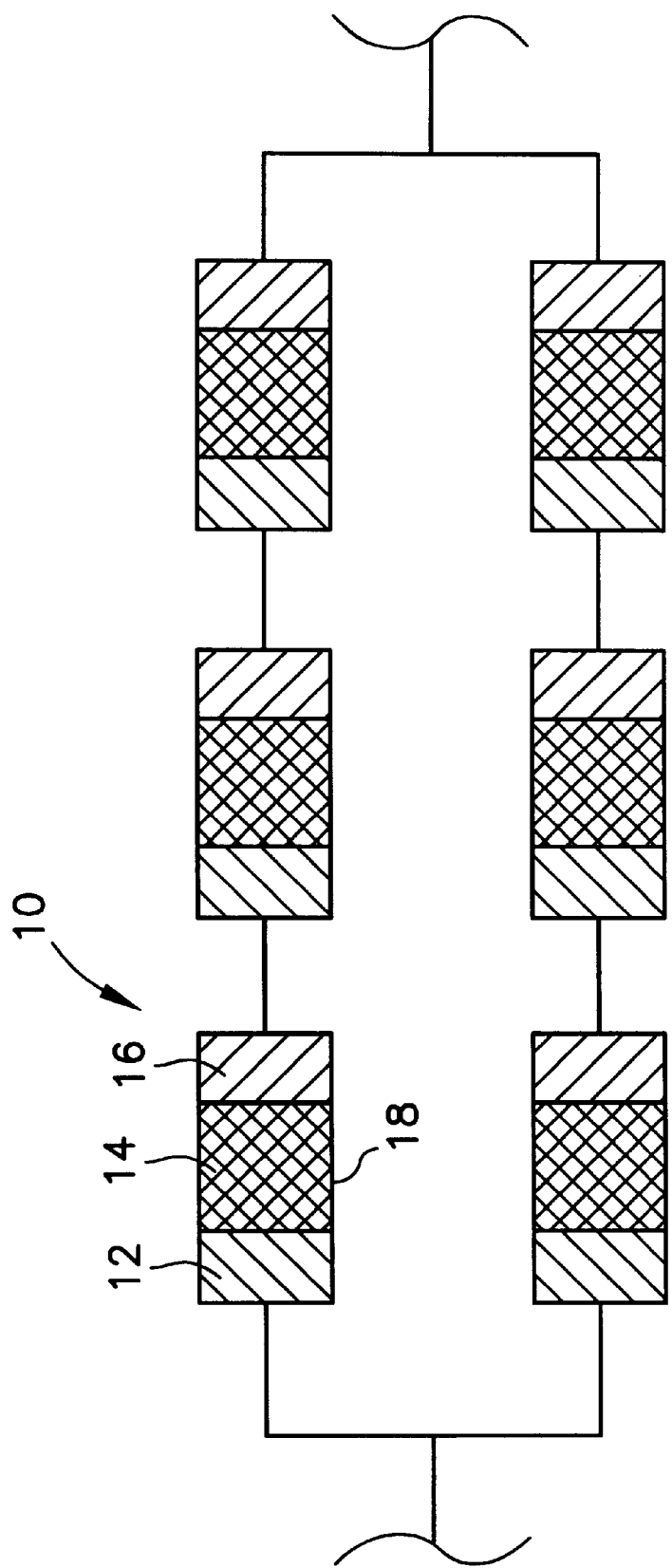
FIG. 1a is a schematic representation of one example of a battery employing the electrochemical cells of the invention.

Referring now to the drawings and particularly to FIG. 1, there is disclosed an electrochemical cell 10 having an anode 12 separated by an electrolyte 14 and a cathode 16, all contained in an insulating housing 18 with the anode separated from the cathode by the electrolyte and suitable terminals (not shown) being provided in electrical contact respectively with the anode 12 and the cathode 16. FIG. 1a shows a schematic representation of one sample of a battery in which two strings of cells are in parallel and each string comprises three cells in series. Binders and other materials normally associated with both the electrolyte and the anode and the cathode are well known and are not described herein, but are included as is understood by those of ordinary skill in the art. The electrodes of the subject invention are based upon lithium titanium oxide spinel. Li$_4$Ti$_5$O$_{12}$ is a stoichiometric spinel that has the spinel notation Li[Ti$_{1.67}$Li$_{0.33}$]O$_4$. The structure has the conventional spinel configuration A[B$_2$] X$_4$ where A refers to the tetrahedrally-coordinated cations on the crystallographic 8a sites and B refers to the octahedrally-coordinated cations on the crystallographic 16d sites of the prototypic spinel space group Fd3m which has cubic symmetry. The X anions, that form a cubic-close-packed array, are located at the 32e positions of the space group. The general name for spinel compounds is derived from the mineral "spinel" Mg[Al$_2$]O$_4$.

It is now well known that lithium can be inserted into many spinel compounds at room temperature according to the reaction:

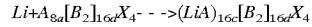

$$Li+A_{8a}[B_2]_{16d}X_4\text{---}\rightarrow(LiA)_{16c}[B_2]_{16d}X_4$$

During this reaction, the tetrahedral A cations are displaced into neighboring octahedral sites to generate a rock salt structure (LiA)$_{16c}$[B$_2$]$_{16d}$X$_4$ in which all the octahedral sites are occupied by the Li, A and B cations. During the lithiation process, the [B$_2$]X$_4$ spinel framework remains intact. The interstitial space of the [B$_2$]X$_4$ spinel framework provides a three-dimensional network of the 8a tetrahedra and 16c octahedra through which the lithium ions are able to diffuse. Thus, when the A cations are lithium ions, the lithium ions are able to diffuse in an unrestricted manner through the interstitial space, thus allowing rapid lithium-ion transport. Li[Ti$_{1.67}$Li$_{0.33}$]O$_4$ is an example of such a spinel, a major limitation being its insulating character because all the titanium ions are tetravalent.

In a first embodiment of the invention, there is provided a family of modified spinel compounds in which the lithium ions on the octahedral B sites of Li[Ti$_{1.67}$Li$_{0.33}$]O$_4$ are partially replaced by either magnesium and/or aluminum. This family of spinel compounds can be represented by the general formula Li[Ti$_{1.67}$Li$_{0.33-y}$M$_y$]O$_4$, for 0<y≦0.33, where M=Mg and/or Al. For the case where M=Mg, the one end member of the solid solution series, i.e., without any M cations, is Li[Ti$_{1.67}$Li$_{0.33}$]O$_4$(y=0), described above in which all the titanium ions are tetravalent; Li[Ti$_{1.67}$Li$_{0.33}$]O$_4$ is thus an insulator. The other end member is Li[Ti$_{1.67}$Mg$_{0.33}$]O$_4$ (y=0.33), in which the lithium ions on the octahedral 16d sites have been completely substituted by magnesium. In Li[Ti$_{1.67}$Mg$_{0.33}$]O$_4$, the titanium ions are of mixed Ti$^{4+}$/Ti$^{3+}$ valence, the average oxidation state being 3.80, i.e., the compound is a mixed-valent spinel with enhanced electronic conductivity compared to Li[Ti$_{1.67}$Li$_{0.33}$]O$_4$. In Li[Ti$_{1.67}$Mg$_{0.33}$]O$_4$ the magnesium ions occupy the B sites of the spinel structure and, therefore, leave the interstitial space of 8a tetrahedra and 16c octahedra available for the unrestricted diffusion of lithium ions. For this electrode composition, the electrochemical reaction is:

$$Li+Li[Ti_{1.67}Mg_{0.33}]O_4 \rightarrow Li_2[Ti_{1.67}Mg_{0.33}]O_4$$

In the discharged (rock salt) product, Li$_2$[Ti$_{1.67}$Mg$_{0.33}$]O$_4$, that represents a fully charged negative electrode, the titanium ions are reduced to an average oxidation state of 3.19, leaving the spinel structure with mixed valence (Ti$^{4+}$ and Ti$^{3+}$) and hence higher electronic conductivity. Thus, the electrode maintains mixed valent Ti$^{4+}$/Ti$^{3+}$ character throughout charge and discharge with enhanced electrical conductivity over the parent compound Li$_4$Ti$_5$O$_{12}$. It is also possible to fabricate Li[Ti$_{1.67}$Li$_{0.33-y}$Mg$_y$]O$_4$ spinel compounds with intermediate values of y, such as Li[Ti$_{1.67}$Li$_{0.30}$Mg$_{0.03}$]O$_4$ thereby tailoring the amount of Ti$^{4+}$ and Ti$^{3+}$ ions in the starting spinel electrode structure and in the final lithiated spinel (rock salt) structure. Mg substitution in the spinel structure does not significantly alter the capacity of the electrode. For example, the theoretical capacity of Li[Ti$_{1.67}$Mg$_{0.33}$]O$_4$ (169 mAh/g) is only slightly smaller than that of Li[Ti$_{1.67}$Li$_{0.33}$]O$_4$ (175 mAh/g). A particular advantage of the Mg-substituted spinel materials is that for the lower concentrations of Mg substitution, although prepared under inert atmospheric conditions, the materials are stable in air at room temperature.

When aluminum is used as the M cation, the cation-substituted electrode is represented by Li[Ti$_{1.67}$Li$_{0.33-y}$Al$_y$]O$_4$ (0<y≦0.33). In the fully-substituted compound (y=0.33), the average oxidation state of the titanium ions is 3.59, and in the fully lithiated compound Li$_2$[Ti$_{1.67}$Al$_{0.33}$]O$_4$ which represents a fully charged negative electrode, the average oxidation state is 3.0. Because it is desirable to keep the average oxidation state of the titanium ions between 3.0 and 4.0 during all states of charge and discharge, it is preferable to keep the value of y below 0.33 when Al is used as the only M cation. Like Mg substitution, Al substitution does not significantly alter the capacity of the spinel electrode. For example, the theoretical capacity of Li[Ti$_{1.67}$Al$_{0.33}$]O$_4$ (168 mAh/g) is only slightly smaller than that of Li[Ti$_{1.67}$Li$_{0.33}$]O$_4$ (175 mAh/g). The invention extends to include compositions Li[Ti$_{1.67}$Li$_{0.33-y}$M$_y$]O$_4$ (0<y≦0.33), in which M can be Mg and Al, for example, Li[Ti$_{1.67}$Mg$_{0.167}$Al$_{0.167}$]O$_4$.

In a second embodiment of the invention, there is provided a family of spinel compounds Li[Ti$_{1.67}$Li$_{0.33-y}$M$_{y-z}$M'$_z$]O$_4$ that can be derived from Li[Ti$_{1.67}$Li$_{0.33-y}$M$_y$]O$_4$ by partial substitution of the M cations by M' cations where 0<y≦0.33, z<y, M is Mg$^{2+}$ and/or Al$^{3+}$, and M' is one or more suitable monovalent, divalent, trivalent and tetravalent metal cations. By suitable, we mean that the M' cations are selected preferably from the first row of transition metal elements, Sc, Ti, V, Cr, Mn, Fe, Co, Ni, Cu and Zn, and more preferably from Ti$^{4+}$, Co$^{3+}$, Co$^{2+}$, Ni$^{3+}$ and Ni$^{2+}$ such that the fully charged and fully discharged (negative) spinel electrodes contain a mixed-valent Ti$^{4+}$/Ti$^{3+}$ couple. For example, when M=Mg$^{2+}$, and M'=Ti$^{4+}$, x=0.33, and y=0.17, the electrode would have the composition Li[Ti$_{1.67}$Mg$_{0.17}$Ti$_{0.17}$]O$_4$, or alternatively, Li[Ti$_{1.84}$Mg$_{0.17}$]O$_4$. In this example, the average oxidation state of the titanium ions in the discharged negative electrode is 3.62, whereas in the lithiated fully-charged negative electrode Li$_2$[Ti$_{1.84}$Mg$_{0.17}$]O$_4$, the average oxidation state of the titanium ions is 3.08, in compliance with the need for mixed Ti$^{4+}$/Ti$^{3+}$ to ensure enhanced electronic conductivity at all states of charge and discharge. Thus, it can be understood from the principles of this invention that a variety of monovalent, divalent, trivalent or tetravalent M' metal cations can be used with the M cations to ensure Ti$^{4+}$/Ti$^{3+}$ mixed valence thus increasing the electrical conductivity of the lithium-titanium-oxide spinel electrode. Furthermore, it can be understood that the M' cations are selected preferably from those ions that have ionic radii comparable to the Li$^+$, Ti$^{4+}$ and Ti$^{3+}$ ions within the [Ti$_{1.67}$Li$_{0.33-y}$M$_y$]O$_4$ spinel framework, preferably within 0.15 Å.

In practice, it is difficult to prepare lithium spinel compounds with the precise stoichiometric a Li[B$_2$]O$_4$ formula, where B is a metal cation; these spinel compounds often contain defects or vacancies, and sometimes a small degree of spinel inversion. For example, it is possible that a small amount of the substituted metal cation M, such as magnesium or aluminum may be found on the tetrahedral 8a sites as well as the octahedral 16d sites of the spinel structure without causing a significant change to the electrochemical properties of the spinel electrode. Indeed, a small amount of dopant cation on the tetrahedral sites may serve to stabilize the interstitial space of the spinel structure to lithium insertion/extraction. This invention embodies these slight changes in composition and site occupancies of the spinel structure. The principles of this invention are demonstrated with respect to the compounds Li[Ti$_{1.67}$Mg$_{0.33}$]O$_4$ (alternatively, Li$_3$MgTi$_5$O$_{12}$), Li[Ti$_{1.67}$Li$_{0.30}$Mg$_{0.03}$]O$_4$ (alternatively, Li$_{3.9}$Mg$_{0.1}$Ti$_5$O$_{12}$), and Li[Ti$_{1.67}$Li$_{0.25}$Al$_{0.08}$]O$_4$ (alternatively, Li$_{3.75}$Al$_{0.25}$Ti$_5$O$_{12}$)

Experimental

EXAMPLE

Figure 2A:
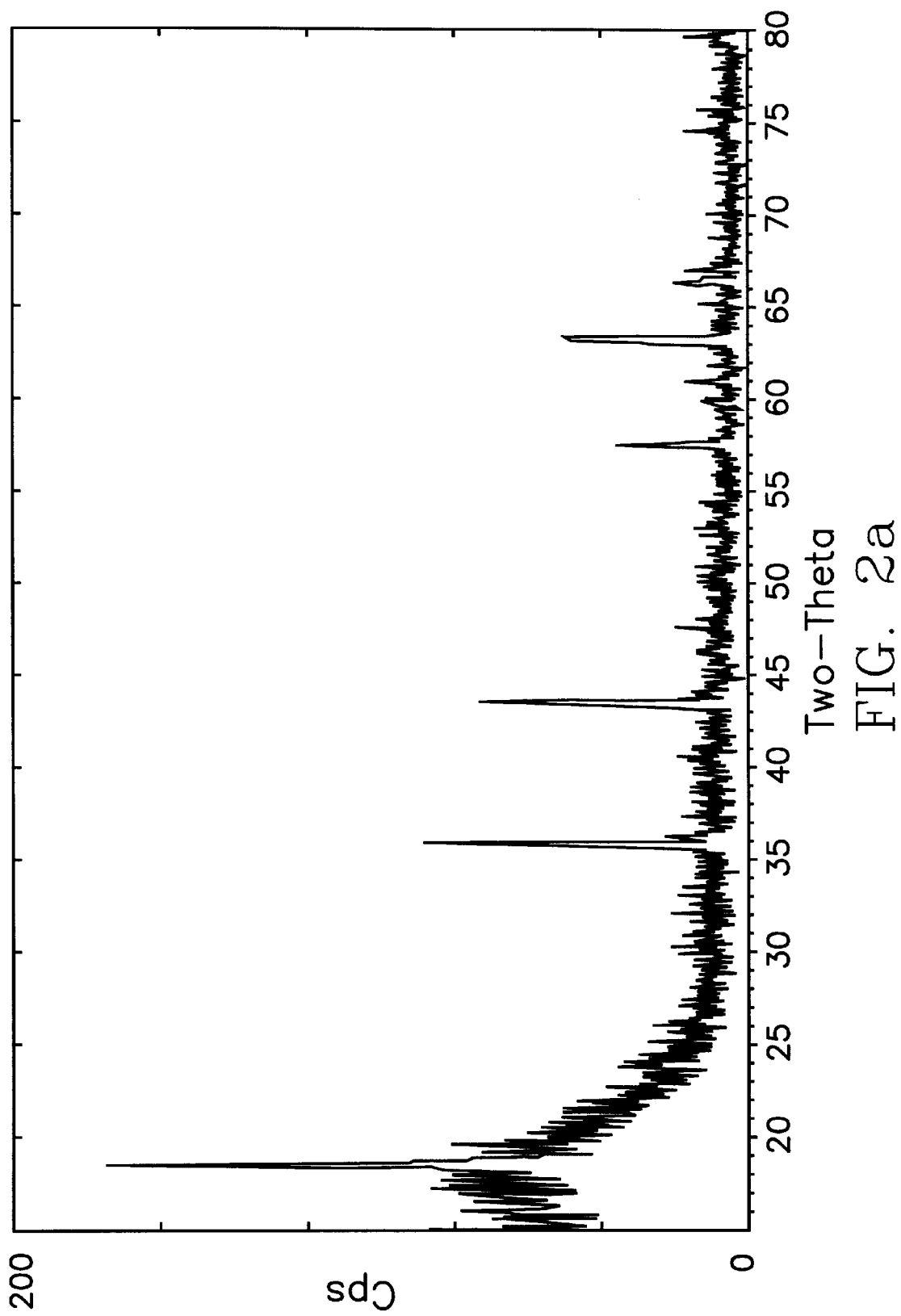
FIG. 2a is a representation of a powder X-ray diffraction pattern of a Li[Ti$_{1.67}$Mg$_{0.33}$]O$_4$ spinel product.
Figure 2B:
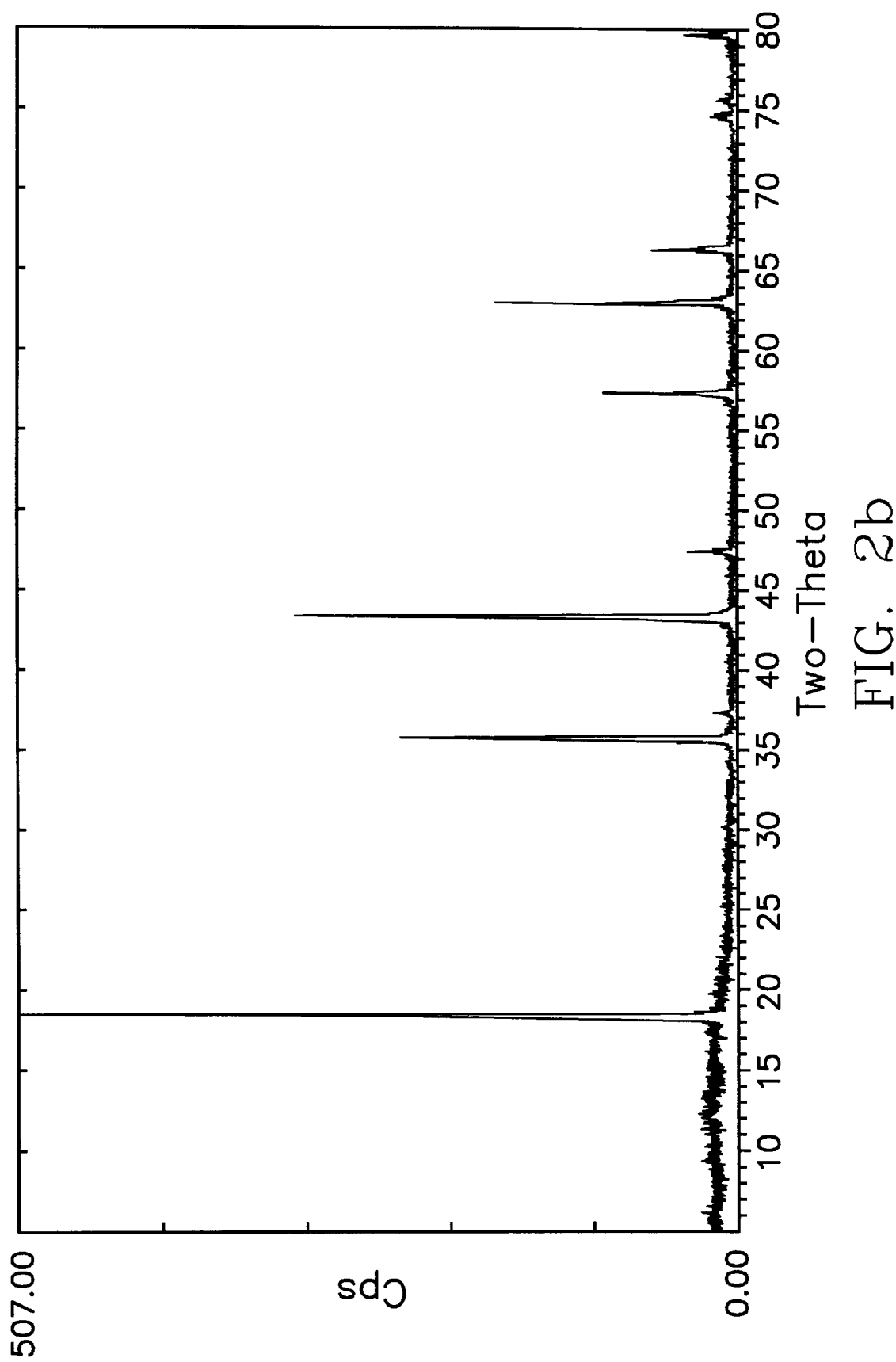
FIG. 2b is a representation of a powder X-ray diffraction pattern of a Li[Ti$_{1.67}$Li$_{0.30}$Mg$_{0.03}$]O$_4$ spinel product.

Li[Ti$_{1.67}$Li$_{0.33-x}$Mg$_x$]O$_{12}$ materials were prepaed typically by reacting LiOH●H$_2$O, TiO$_2$ (anatase) and Mg(OH)$_2$ or Mg(NO$_3$)$_2$ in the required stoichiometric amounts. The materials were first intimately mixed and calcined at 1000° C. for 6 hours under a helium atmosphere containing 3% hydrogen. Unlike Li[Ti$_{1.67}$Li$_{0.33}$]O$_4$(Li$_4$Ti$_5$O$_{12}$), which is white and an insulator, the Li[Ti$_{1.67}$Li$_{0.33-y}$Mg$_y$]O$_4$ products were blue to black in color, indicating that the spinel structure had mixed-valent Ti$^{4+}$/Ti$^{3+}$ character, with electronic conductivity. The powder X-ray diffraction pattern of the Li[Ti$_{1.67}$Mg$_{0.33}$]O$_4$ (x=0.33) product is shown in FIG. 2a, and the pattern of Li[Ti$_{1.67}$Li$_{0.30}$Mg$_{0.03}$]O$_4$ (y=0.03) is shown on FIG. 2b. The patterns are characteristic of single-phase spinel compounds. The X-ray diffraction patterns of products with y>0.33 generally showed several phases, typically a spinel phase that resembled Li[Ti$_{1.67}$Mg$_{0.33}$]O$_4$, and in addition, phases resembling Li$_2$MgTi$_3$O$_8$ and MgTi$_2$O$_5$.

EXAMPLE 2

Figure 2C:
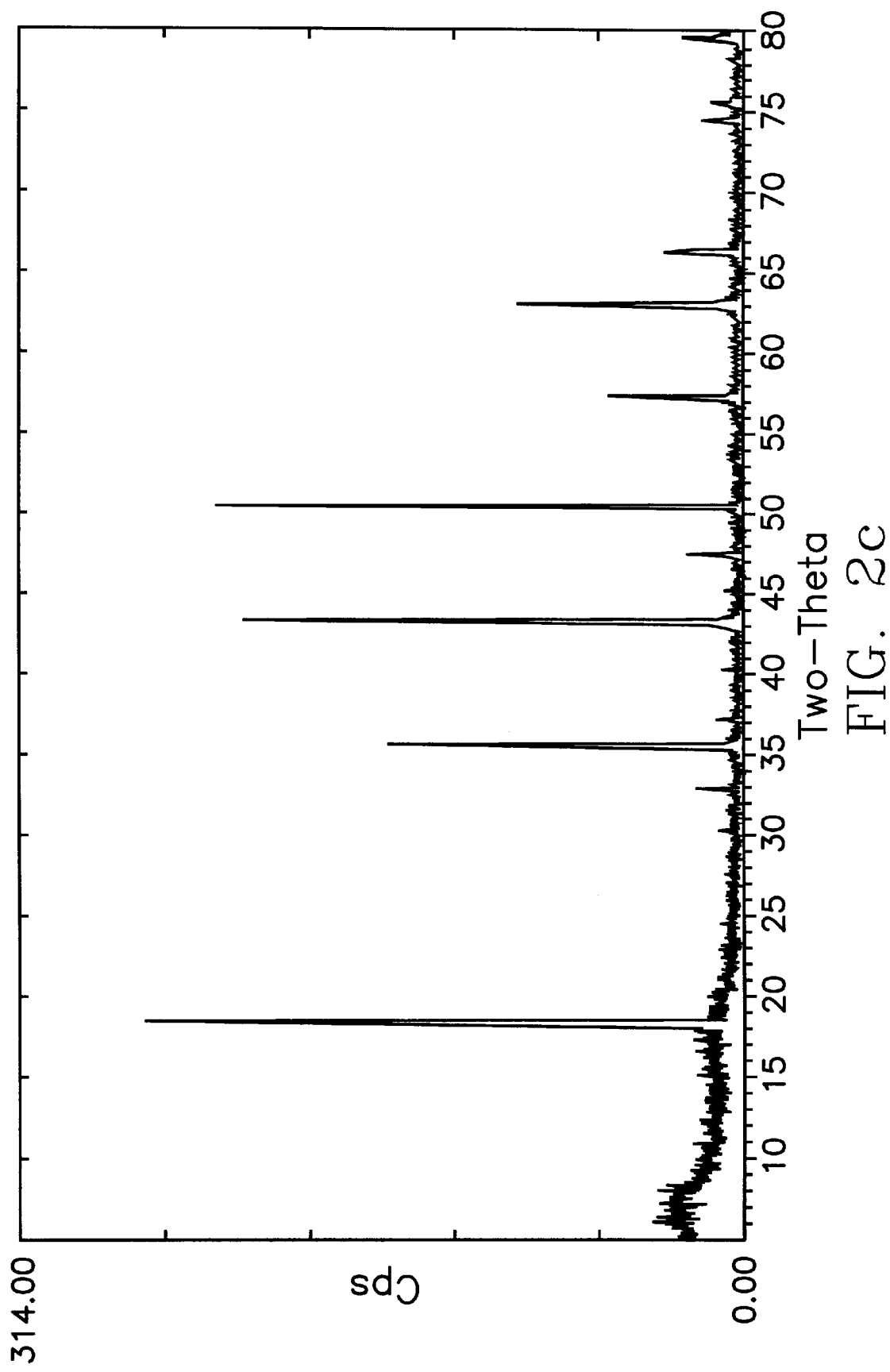
FIG. 2c is a representation of a powder X-ray diffraction pattern of a Li[Ti$_{1.67}$Li$_{0.25}$Al$_{0.08}$]O$_4$ spinel product.

Li[Ti$_{1.67}$Li$_{0.33-y}$Al$_y$]O$_4$ materials were prepared typically by reacting LiOH H$_2$O, TiO$_2$ (anatase) and Al(NO$_3$)$_3$ in the required stoichiometric amounts. The materials were first intimately mixed and calcined at 1000° C. for 6 hours under a helium atmosphere containing 3% hydrogen. Unlike Li[Ti$_{1.67}$Li$_{0.33}$]O$_4$(Li$_4$Ti$_5$O$_{12}$), which is white and an insulator, the Li[Ti$_{1.67}$Li$_{0.33-y}$Al$_y$]O$_{12}$ products were blue/black in color, indicating that the spinel structure had mixed-valent Ti$^{4+}$/Ti$^{3+}$ character, with electronic conductivity. The powder X-ray diffraction pattern of the single-phase Li[Ti$_{1.67}$Li$_{0.25}$Al$_{0.08}$]O$_4$ (y=0.33) product is shown in FIG. 2c. Products with y>0.1 tended to consist of several phases, typically a cubic spinel phase that resembled Li[Ti$_{1.67}$Al$_{0.33}$]

$O_4$, and in addition, a $TiO_2$ (rutile) phase and a second spinel phase $LiAl_5O_8$. It is believed that by improving processing techniques, it will be possible to obtain single-phase $Li[Ti_{1.67}Li_{0.33-x}Al_x]O_4$ products for the range $0<y\leq0.33$.

EXAMPLE 3

Figure 3A:
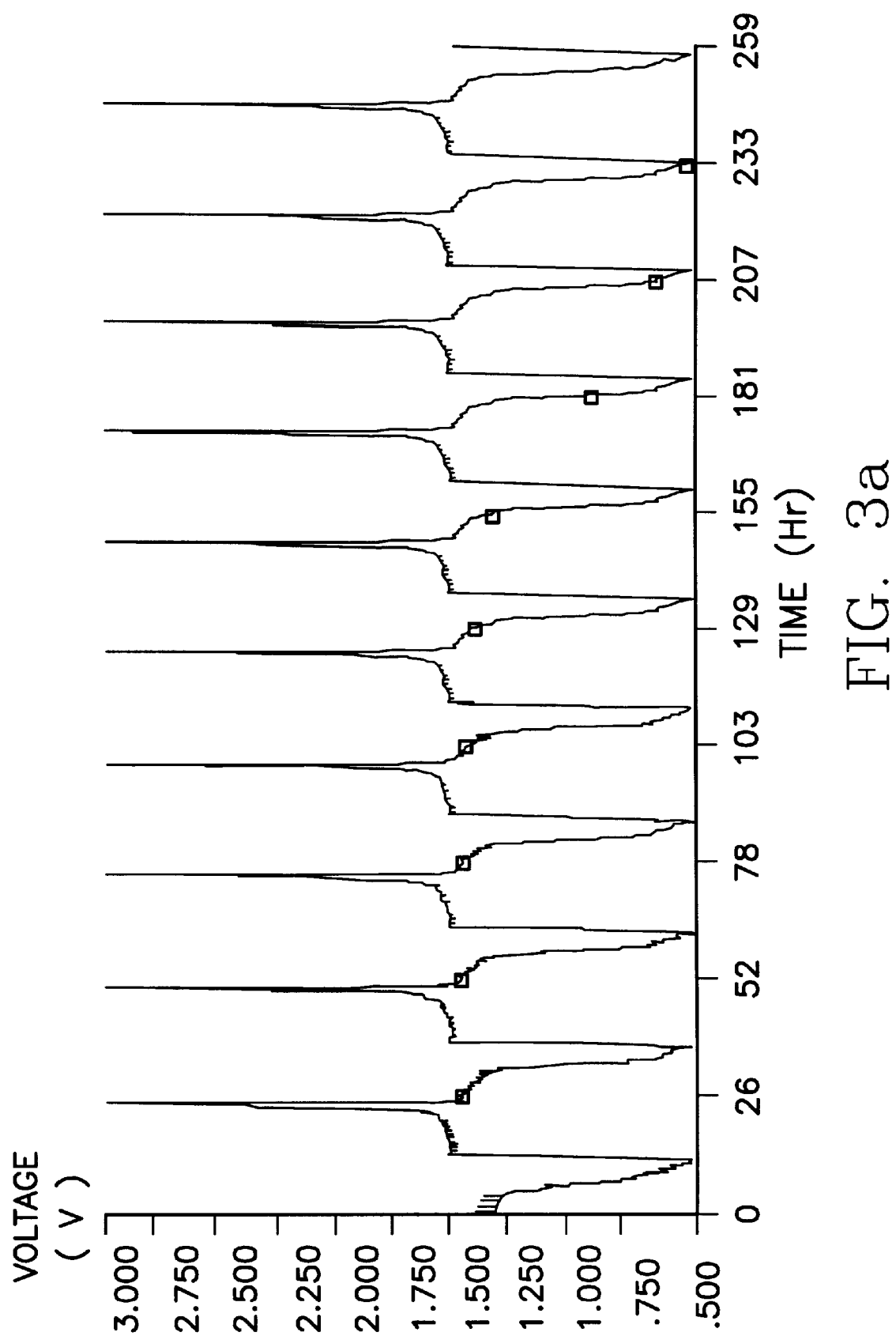
FIG. 3a is a graphical representation of the voltage profiles for the first ten cycles of a Li/Li[Ti$_{1.67}$Mg$_{0.33}$]O$_4$ cell.
Figure 3B:
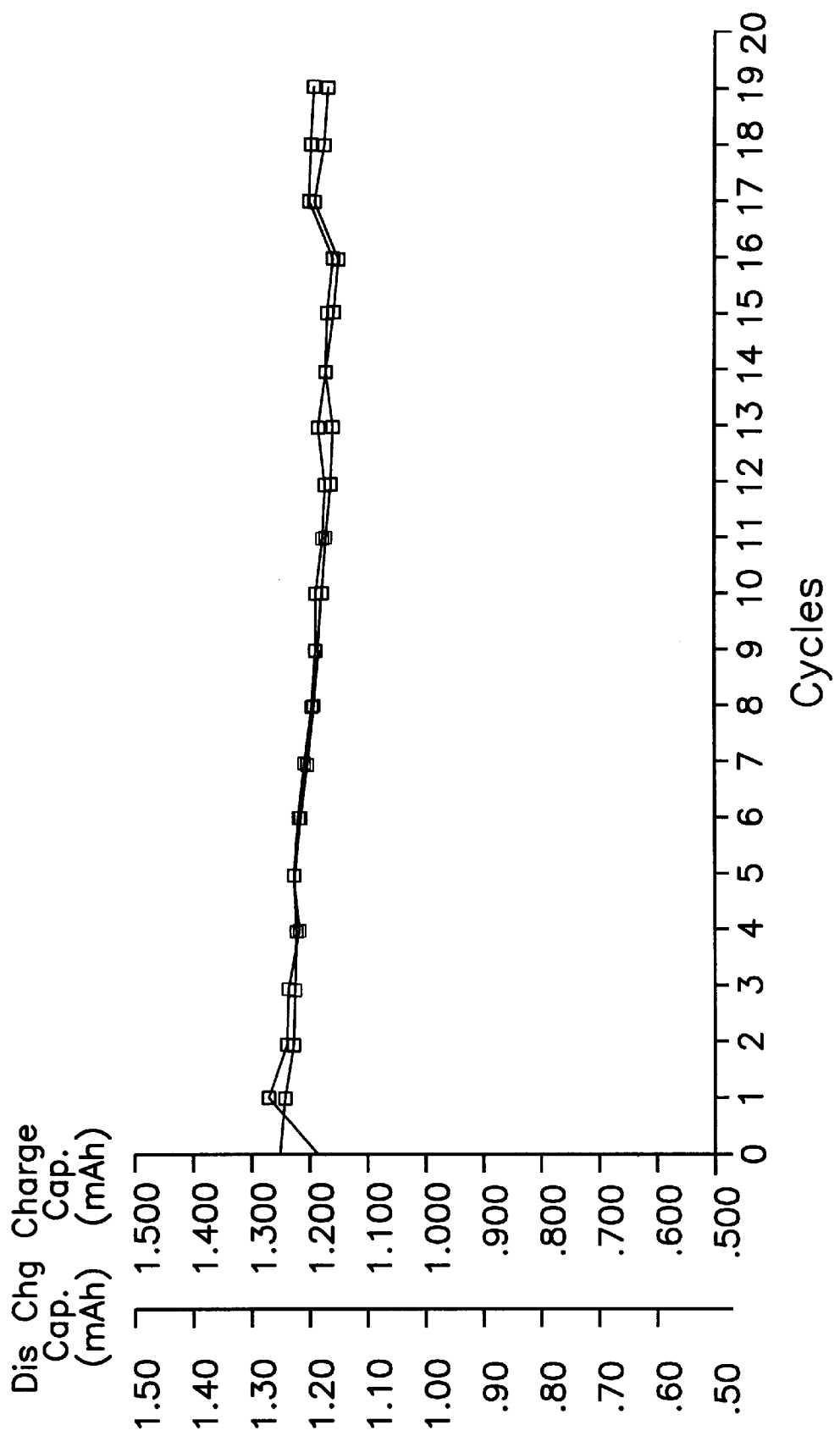
FIG. 3b is a graphical representation of the capacity versus cycle number for a Li/Li[Ti$_{1.67}$Mg$_{0.33}$]O$_4$ cell over the first nineteen cycles.
Figure 4A:
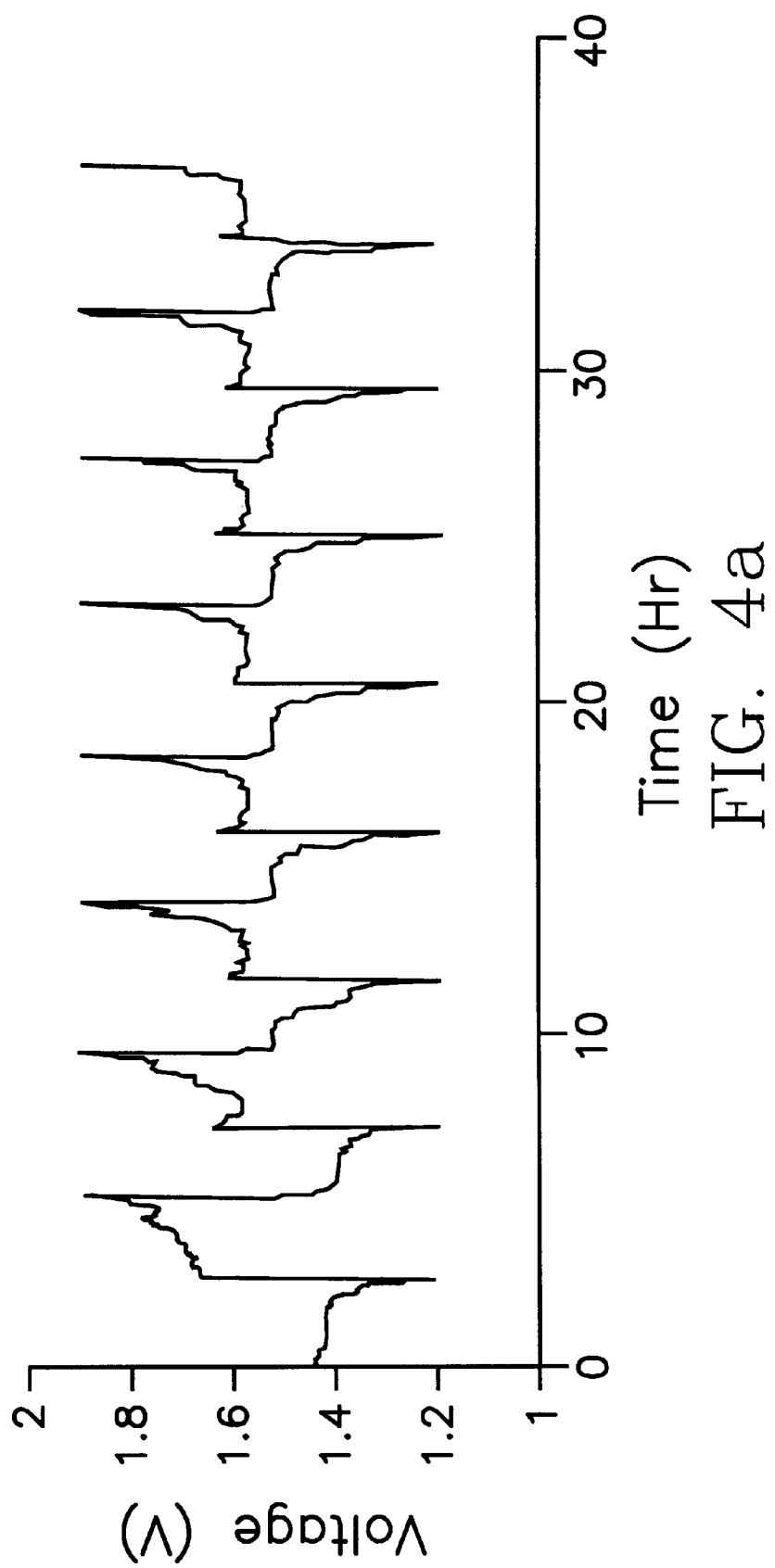
FIG. 4a is a graphical representation of the voltage profiles for the first eight cycles of a Li/Li [Ti$_{1.67}$Li$_{0.30}$Mg$_{0.03}$]O$_4$ cell.
Figure 4B:
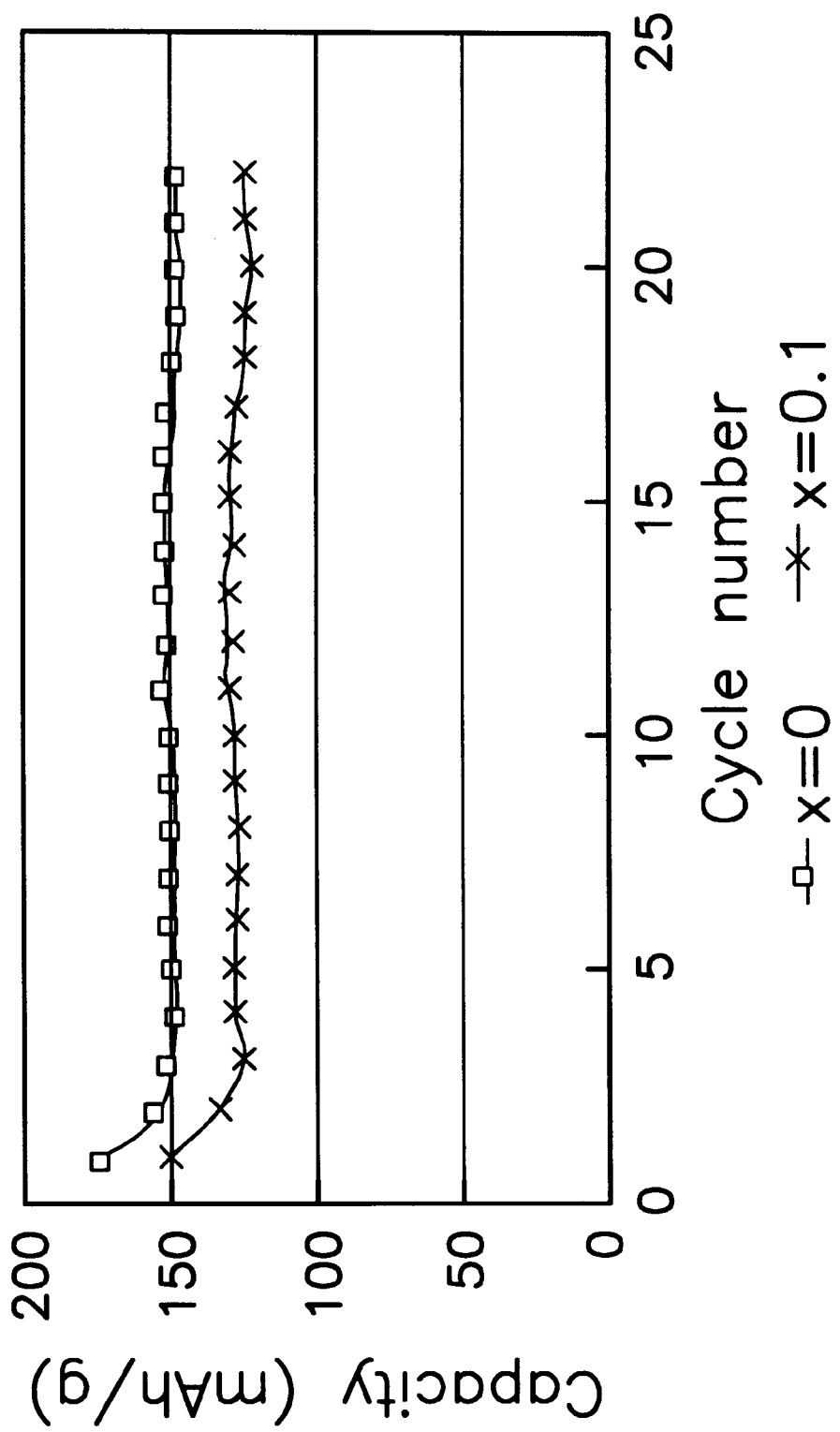
FIG. 4b is a graphical representation of the capacity versus cycle number for a Li/Li[Ti$_{1.67}$Li$_{0.30}$Mg$_{0.03}$]O$_4$ cell over the first twenty two cycles. The performance of a standard Li/Li[Ti$_{1.67}$Li$_{0.33}$]O$_4$ cell is given for comparison.
Figure 5A:
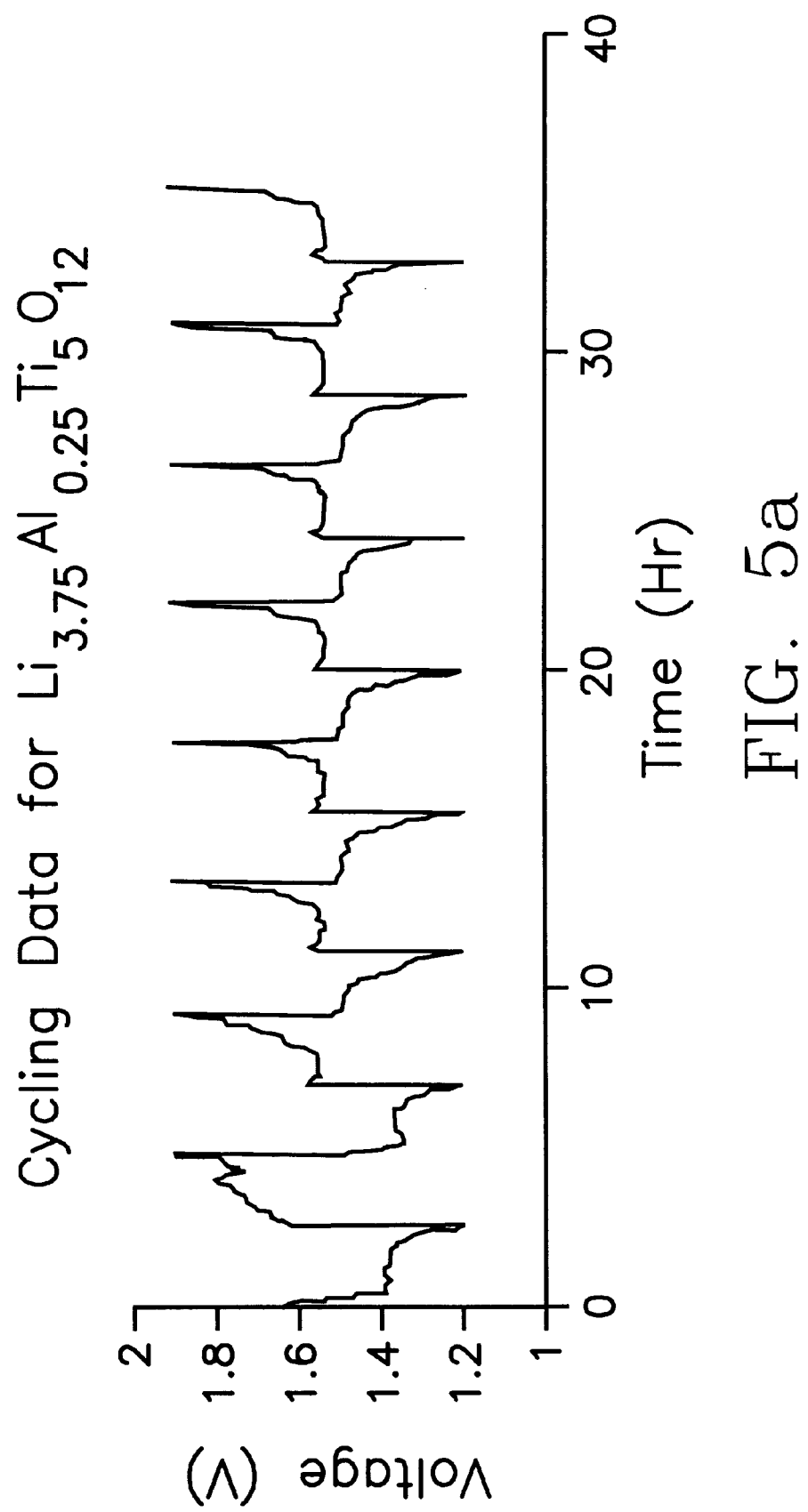
FIG. 5a is a graphical representation of the voltage profiles for the first eight cycles of a Li/Li[Ti$_{1.67}$Li$_{0.25}$Al$_{0.08}$] O$_4$ cell.
Figure 5B:
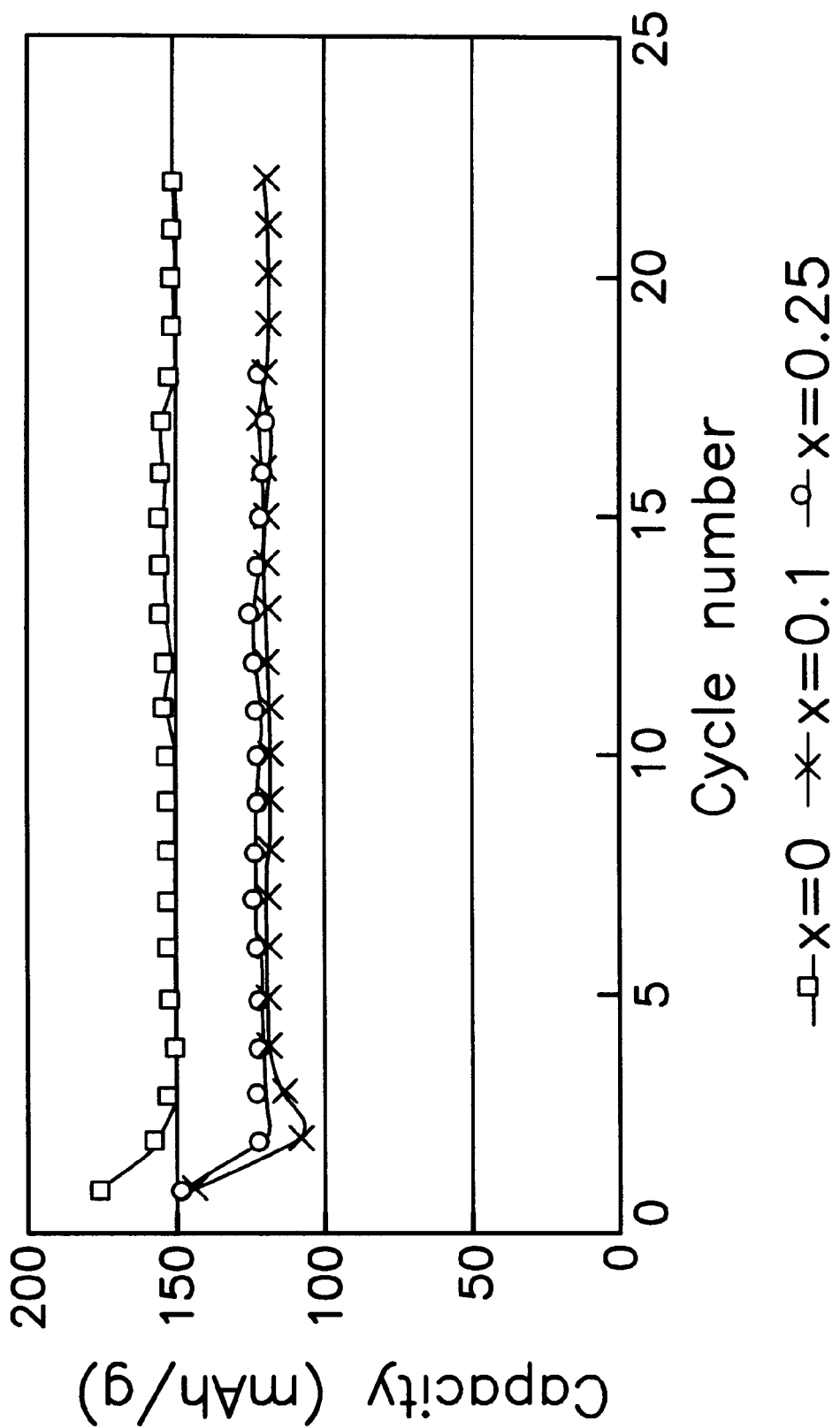
FIG. 5b is a graphical representation of the capacity versus cycle number for a Li/Li[Ti$_{1.67}$Li$_{0.30}$Al$_{0.03}$]O$_4$ cell over the first twenty two cycles and a Li/Li [Ti$_{1.67}$Li$_{0.25}$Al$_{0.08}$]O$_4$ cell over the first eighteen cycles. The performance of a standard Li/Li[Ti$_{1.67}$Li$_{0.33}$]O$_4$ cell is given for comparison.

$Li[Ti_{1.67}Li_{0.33-y}M_y]O_4$ materials (M=Mg, Al) were evaluated in lithium coin cells (size 1225) with the configuration: Li/1 M $LiPF_6$ in ethylene carbonate:dimethyl carbonate (50:50)/$Li[Ti_{1.67}Li_{0.33-y}M_y]O_4$. Metallic lithium was used as the negative electrode for the evaluations. The positive electrode consisted of a blend of 81% active $Li[Ti_{1.67}Li_{0.33-y}M_y]O_4$ spinel material, 10% binder (Kynar 2801) and 9% carbon (XC-72), laminated onto an aluminum foil substrate. Cells were charged and discharged at a constant current rate of between 0.1 $mA/cm^2$ and 0.25 $mA/cm^2$ between voltage limits of 3.0 and 0.5 V. The voltage profiles of the first twenty cycles for Li/$Li[Ti_{1.67}Mg_{0.33}]O_4$, Li/Li$[Ti_{1.67}Li_{0.30}Mg_{0.03}]O_4$ and Li/$Li[Ti_{1.67}Li_{0.25}Al_{0.08}]O_4$ cells are shown in FIGS. 3a, 4a and 5a, respectively. These figures show that most of the capacity of these cells is delivered between 1.5 and 1.3 V. End-of-charge and end-of-discharge is indicated by a rapid increase and decrease in cell voltage respectively. The good retention of capacity of the cells on cycling is shown in FIGS. 3b, 4b, and 5b, respectively, in which the capacity of the spinel electrodes decreases only marginally over the first twenty cycles. Thus the data in FIGS. 3a and b, 4a and b, and 5a and b, indicate the excellent potential that substituted lithium-titanium-oxide spinel materials have as electrodes for rechargeable lithium batteries.

EXAMPLE 4

Figure 6:
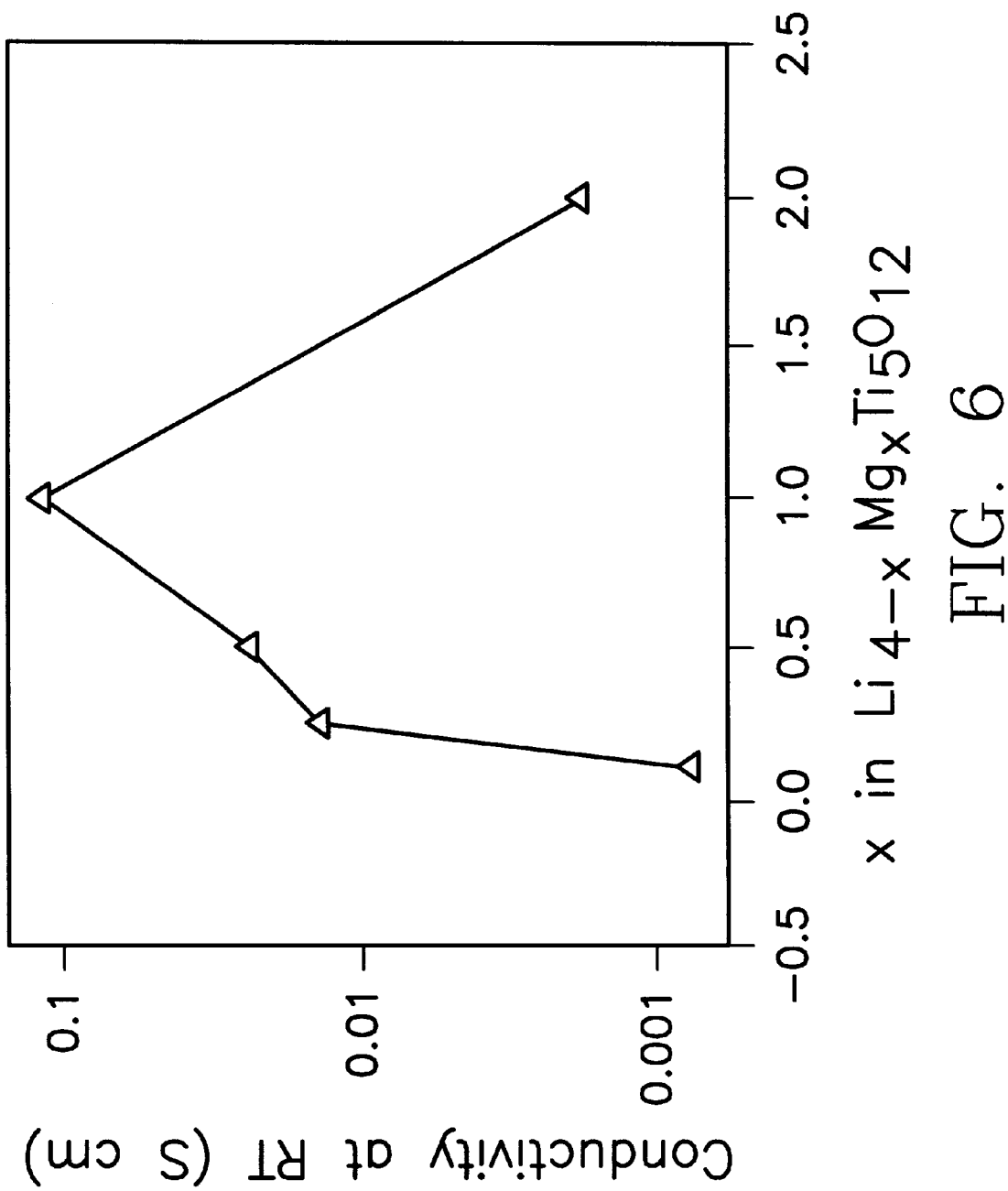
FIG. 6 is a plot of the electronic conductivity (S cm$^{-1}$) versus composition (x) for various Li$_{4-x}$Mg$_x$Ti$_5$O$_{12}$ materials.

The electronic conductivity of $Li[Ti_{1.67}Li_{0.33-y}M_y]O_4$ materials was determined by a standard four-point probe technique using a compacted disc of $Li[Ti_{1.67}Li_{0.33-y}M_y]O_4$ between two indium electrodes. A plot of the conductivity versus composition for $Li[Ti_{1.67}Li_{0.33-y}Mg_y]O_4$ samples (alternatively $Li_{4-x}Mg_xTi_5O_{12}$) is shown in FIG. 6. The plot shows that the electronic conductivity of the spinel samples increases significantly with Mg substitution to reach a maximum value of 0.1 S $cm^{-1}$ at a composition $Li[Ti_{1.67}Mg_{0.33}]O_4$; this composition coincides with the fall replacement of Li by Mg on the octahedral 16d sites of the spinel structure. In the aluminum-doped samples, $Li[Ti_{1.67}Li_{0.33-y}Al_y]O_4$, a significant improvement in the electronic conductivity was also observed in accordance with the principles of this invention. For example, the conductivity of single-phase $Li[Ti_{1.67}Li_{0.25}Al_{0.08}]O_4$ was $8\times10^{-5}$ S $cm^{-1}$, i.e., many orders of magnitude greater than that observed in a standard $Li[Ti_{1.67}Li_{0.33}]O_4$ ($Li_4Ti_5O_{12}$) sample. Because $Li[Ti_{1.67}Li_{0.33}]O_4$ is such an excellent electronic insulator, its exact electronic conductivity could not be determined because it was below the resolution of the measuring equipment (typically less than $10^{-12}$ S $cm^{-1}$).

EXAMPLE 5

Figure 7:
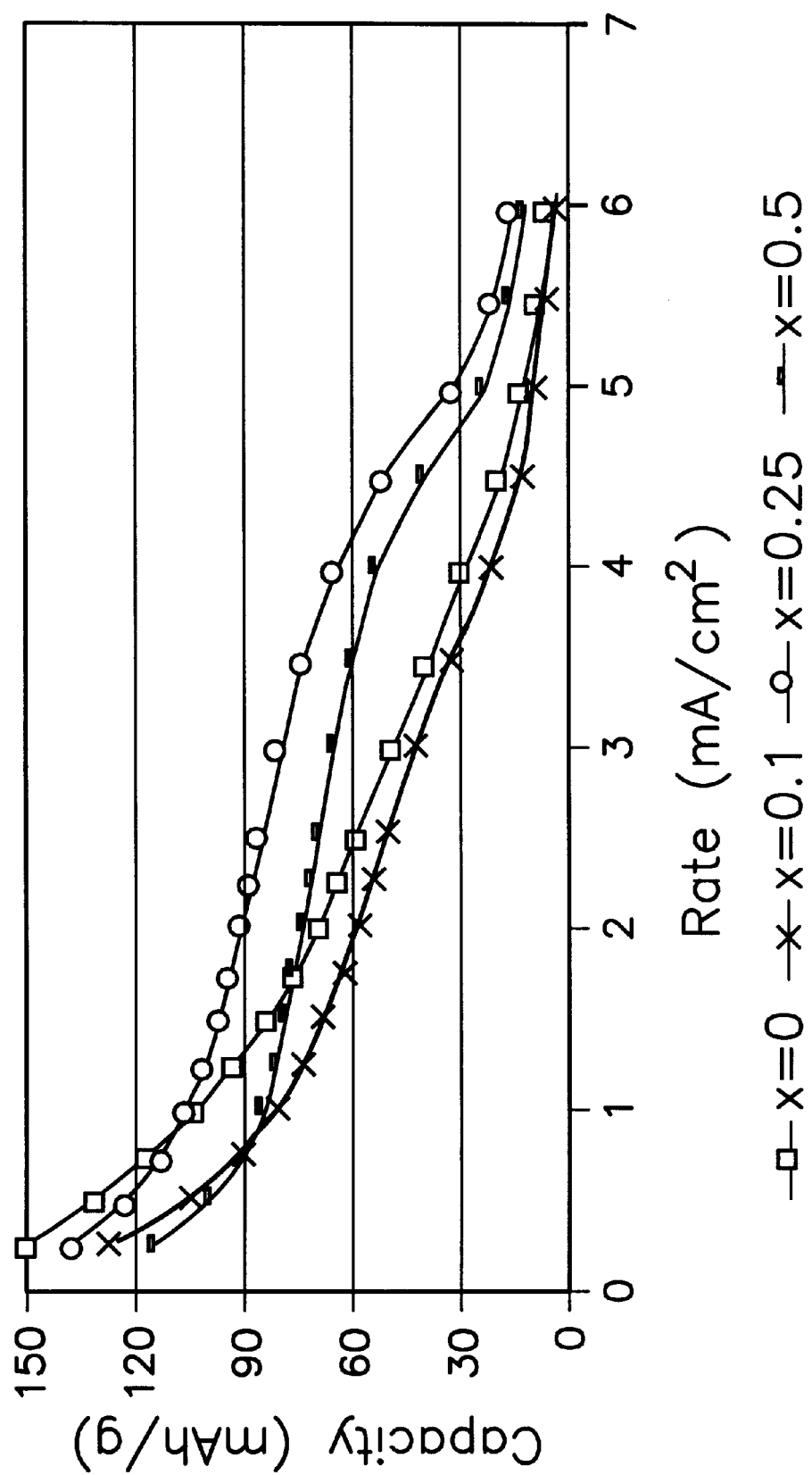
FIG. 7 is a plot of delivered electrode capacity versus discharge rate for various Li/Li$_{4-x}$Mg$_x$Ti$_{12}$ cells.
Figure 8:
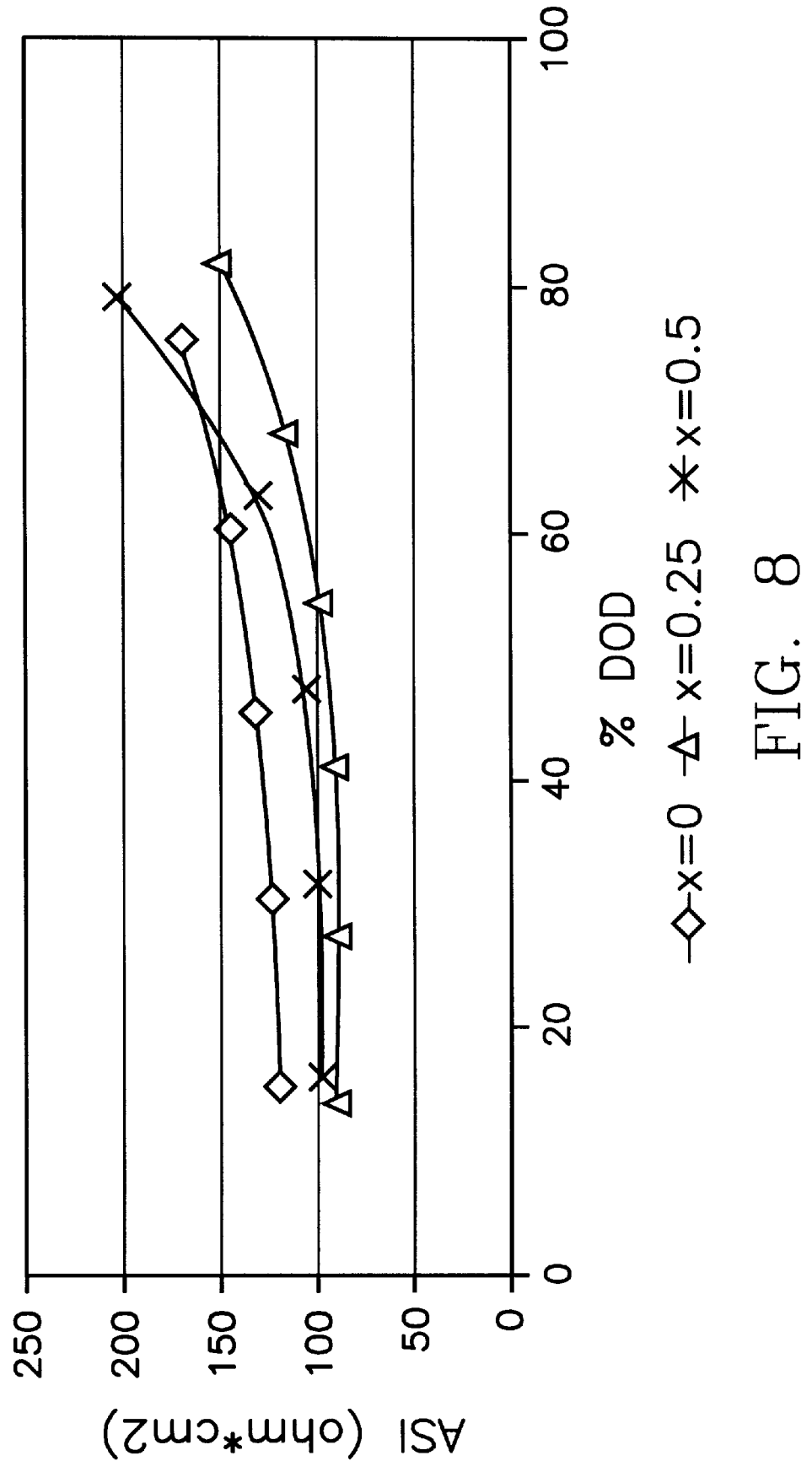
FIG. 8 is a plot of the area specific impedance (ASI) (ohm cm$^2$) for various Li/Li$_{4-x}$Mg$_x$Ti$_5$O$_{12}$ cells.

The improvement in the electronic conductivity of the electrodes of the invention was also evaluated by monitoring the current rate capability and area specific impedance (ASI) of Li/$Li[Ti_{1.67}Li_{0.33-y}M_y]O_4$ cells. The current rate capability was evaluated by determining the capacity that could be obtained from the electrodes at various current rates. For example, FIG. 7 demonstrates that $Li[Ti_{1.67}Li_{0.33-y}Mg_y]O_4$ electrodes with y=0.08 and 0.167 (alternatively $Li_{4-x}Mg_xTi_5O_{12}$ with x=0.25 and 0.5) provide significantly greater capacities when discharged at higher current rates than standard $Li[Ti_{1.67}Li_{0.33}]O_4$ ($Li_4Ti_5O_{12}$) electrodes. FIG. 8 shows the area specific impedance of the cells, calculated from the relaxation voltage (delta V) after a 30-second interrupt and the discharge current (0.25 $mA/cm^2$). FIG. 8 clearly shows that the cell impedance of Li/$Li[Ti_{1.67}Li_{0.33-y}Mg_y]O_4$ cells with y=0.08 and y=0.167 (alternatively $Li_{4-x}Mg_xTi_5O_{12}$ with x=0.25 and 0.5) is significantly lower than that of cells with standard $Li[Ti_{1.67}Li_{0.33}]O_4$ ($Li_4Ti_5O_{12}$) spinel electrodes.

While there has been disclosed what is considered to be the preferred embodiment of the present invention, it is understood that various changes in the details may be made without departing from the spirit, or sacrificing any of the advantages of the present invention.

We claim:

1. A negative electrode for a non-aqueous electrochemical lithium cell having a spinel-type structure with the general formula $Li[Ti_{1.67}Li_{0.33-y}M_y]O_4$, for $0<y\leq0.33$, where M=Mg and/or Al.

2. A negative electrode of claim 1, wherein the M cations are partially replaced by one or more suitable divalent, trivalent or tetravalent metal M' cations to provide an electrode $Li[Ti_{1.67}Li_{0.33-y}M_{y-z}M'_z]O_4$ in which z<y.

3. A negative electrode of claim 2, wherein the M' cations are selected from the first row of transition metal elements.

4. A negative electrode of claim 3, wherein the M' cations are selected from $Ti^{4+}$, $Co^{3+}$, $Ni^{3+}$, $Co^{2+}$ and $Ni^{2+}$.

5. A non-aqueous lithium electrochemical cell comprising a negative electrode, an electrolyte and a positive electrode, the negative electrode consisting of a spinel-type structure with the general formula $Li[Ti_{1.67}Li_{0.33-y}M_y]O_4$, for $0<y\leq0.33$, where M=Mg and/or Al.

6. A non-aqueous lithium electrochemical cell of claim 5 comprising a negative electrode, an electrolyte and a positive electrode, the negative electrode consisting of a $Li[Ti_{1.67}Li_{0.33-y}M_y]O_4$ spinel-type structure in which the M cations are partially replaced by one or more suitable monovalent, divalent, trivalent or tetravalent metal M' cations to provide an electrode $Li[Ti_{1.67}Li_{0.33-y}M_{y-z}M'_z]O_4$ in which z<y, wherein M' cations are selected from one or more of suitable divalent, trivalent or tetravalent metal M' cations to provide an electrode $Li[Ti_{1.67}Li_{0.33-y}M_{y-z}M'_z]O_4$ in which z<y.

7. A non-aqueous lithium electrochemical cell of claim 6 wherein the M' cations are selected from the first row of transition metal elements.

8. A non-aqueous lithium battery comprising an plurality of cells, electrically connected, each cell comprising a negative electrode, an electrolyte and a positive electrode, the negative electrode consisting of a spinel-type structure with the general formula $Li[Ti_{1.67}Li_{0.33-y}M_y]O_4$, for $0<y\leq0.33$, where M=Mg and/or Al.

9. A non-aqueous lithium battery of claim 8 wherein the M cations of the negative electrode are partially replaced by one or more suitable monovalent, divalent, trivalent or tetravalent metal M' cations to provide an electrode $Li[Ti_{1.67}Li_{0.33-y}M_{y-z}M'_z]O_4$ in which z<y, and wherein M' cations are selected from one or more of suitable divalent, trivalent or tetravalent metal M' cations to provide an electrode $Li[Ti_{1.67}Li_{0.33-y}M_{y-z}M'_z]O_4$ in which z<y.

10. A spinel-type material with the general formula $Li[Ti_{1.67}Li_{0.33-y}M_y]O_4$, for $0<y\leq0.33$, where M=Mg and/or Al, wherein the M cations are partially replaced by one or more suitable divalent, trivalent or tetravalent metal M' cations to provide an electrode $Li[Ti_{1.67}Li_{0.33-y}M_{y-z}M'_z]O_4$ in which z<y.

11. The spinel-type material of claim 10, wherein the M' cations are selected from the first row of transition metal elements.

12. The spinel-type material of claim 11, wherein the M' cations are selected from $Ti^{4+}$, $Co^{3+}$, $Ni^{3+}$, $Co^{2+}$ and $Ni^{2+}$.

13. A negative electrode for a non-aqueous electrochemical lithium cell having a spinel-type structure with the general formula $Li[Ti_{1.67}Li_{0.33-y}M_y]O_4$, for $0<y\leq0.33$, where M=Mg and/or Al, wherein the M cations are partially replaced by one or more suitable divalent, trivalent or tetravalent metal M' cations to provide an electrode $Li[Ti_{1.67}Li_{0.33-y}M_{y-z}M'_z]O_4$ in which z<y, and wherein the M' cations are selected from the first row of transition metal elements.

14. A spinel-type material with the general formula $Li[Ti_{1.67}Li_{0.33-y}M_y]O_4$, for $0<y\leq0.33$, where M=Mg and/or Al, wherein the M cations are partially replaced by one or more suitable divalent, trivalent or tetravalent metal M' cations to provide an electrode $Li[Ti_{1.67}Li_{0.33-y}M_{y-z}M'_z]O_4$ in which z<y, wherein the M' cations are selected from $Ti^{4+}$, $Co^{3+}$, $Ni^{3+}$, $Co^{2+}$ and $Ni^{2+}$.

* * * * *

UNITED STATES PATENT AND TRADEMARK OFFICE
CERTIFICATE OF CORRECTION

PATENT NO.    : 6,221,531 B1                                      Page 1 of 1
DATED         : April 24, 2001
INVENTOR(S)   : Vaughey et al.

It is certified that error appears in the above-identified patent and that said Letters Patent is hereby corrected as shown below:

Column 8, claim 1,
Line 19, after "y" but before "0.33," delete "$\underline{\leq}$" and insert -- $\leq$ --

Column 8, claim 5,
Line 33, after "y" but before "0.33," delete "$\underline{\leq}$" and insert -- $\leq$ --

Column 8, claim 8,
Line 50, after "y" but before "0.33," delete "$\underline{\leq}$" and insert -- $\leq$ --

Column 8, claim 10,
Line 63, after "y" but before "0.33," delete "$\underline{\leq}$" and insert -- $\leq$ --

Column 9, claim 13,
Line 9, after "y" but before "0.33," delete "$\underline{\leq}$" and insert -- $\leq$ --

Column 10, claim 14,
Line 5, after "y" but before "0.33," delete "$\underline{\leq}$" and insert -- $\leq$ --

Signed and Sealed this

Twenty-ninth Day of January, 2002

Attest:

Attesting Officer

JAMES E. ROGAN
*Director of the United States Patent and Trademark Office*